United States Patent [19]
Asplund

[11] Patent Number: 5,644,485
[45] Date of Patent: Jul. 1, 1997

[54] CONVERTER CONNECTION WITH A BALANCING CIRCUIT

[75] Inventor: Gunnar Asplund, Ludvika, Sweden

[73] Assignee: Asea Brown Boveri AB, Västerås, Sweden

[21] Appl. No.: 503,860

[22] Filed: Jul. 18, 1995

[30] Foreign Application Priority Data

Aug. 24, 1994 [SE] Sweden .................. 9402827

[51] Int. Cl.$^6$ .................................. H02M 7/155
[52] U.S. Cl. .................................. 363/129; 363/125
[58] Field of Search .................. 363/84, 85, 89, 363/125, 127, 128, 129

[56] References Cited

U.S. PATENT DOCUMENTS

| | | | |
|---|---|---|---|
| 4,375,612 | 3/1983 | Wirth | 318/767 |
| 4,455,598 | 6/1984 | Andre | 363/87 |
| 4,757,435 | 7/1988 | Wood et al. | 363/54 |
| 4,805,082 | 2/1989 | Heinrich et al. | 363/129 |
| 5,267,137 | 11/1993 | Goebel | 363/87 |
| 5,355,294 | 10/1994 | De Doncker et al. | 363/17 |
| 5,483,435 | 1/1996 | Uchino | 363/81 |

FOREIGN PATENT DOCUMENTS

| | | | |
|---|---|---|---|
| 0862337 | 9/1981 | U.S.S.R. | 363/129 |
| 0930298 | 5/1982 | U.S.S.R. | 363/129 |

OTHER PUBLICATIONS

Impulse–Commutated Controller Rectifiers with no Request of Reactive Power from the Power Supply Network, Alexa et al Etz Archiv vol. 2 Nov. 1980 No. 11, pp. 325–326, 4 Figure.

Primary Examiner—Peter S. Wong
Assistant Examiner—Adolf Berhane
Attorney, Agent, or Firm—Watson Cole Stevens Davis, PLCC

[57] ABSTRACT

A converter connection for conversion between alternating voltage and direct voltage, for connection to a power network (DCN) having a neutral pole (P0) and at least one pole (P+,P–) energized by direct voltage in relation to the neutral pole, comprises a voltage-source converter (VC) with two direct-voltage terminals (DP, DM). At least one of the direct-voltage terminals of the converter is connected by means of an electric pole conductor (W1, W12, W11, W21, W2) to at least one of the poles of the power network which are energized by direct voltage. The converter connection further comprises two valves (V7, V8) mutually series-connected at a common point of connection (J), each of said valves comprising a gate turn-off semiconductor valve (T1) and a diode valve (D1) connected thereto in anti-parallel connection, said series connection being connected between the direct-voltage terminals of the converter, and a reactor (SL) with a first terminal (T1) connected to the connection point and a second terminal (T2) which communicates with the neutral pole in an electrically conducting connection. The converter connection may be accommodated in a converter station (SR1 and SR2, respectively) included in an installation for transmission of high-voltage direct current. (FIG. 2)

7 Claims, 7 Drawing Sheets

CONVERTER CONNECTION WITH A BALANCING CIRCUIT

TECHNICAL FIELD

The present invention relates to a converter connection for conversion between alternating voltage and direct voltage, especially at high-voltage direct current, comprising a voltage-source converter connected to an alternating-voltage network without an intermediate separate winding transformer.

The fact that the converter is connected to the alternating-voltage network without an intermediate separate winding transformer means that it may have its alternating-voltage terminals galvanically connected to the alternating-voltage network directly, via an autotransformer and/or reactors for current limiting, or via series-capacitors.

By a voltage-source converter is meant a converter connected between an alternating-voltage network and a direct-voltage network for transmission of active and/or reactive power between the two networks, whereby the direct-voltage network occurs as a stiff voltage source towards the converter.

By a gate turn-off semiconductor valve is meant in this context a set of one or more gate turn-off power semiconductor devices, delimited by two terminals, electrically functioning as a unit and having the property of being able to carry current in one direction.

By a gate turn-off power semiconductor device is meant a power semiconductor device which may be brought to both a conducting and a non-conducting state by means of control signals supplied to a control input. Examples of such gate turn-off power semiconductor devices are so-called Gate Turn-Off Thyristors (GTOs), Insulated Gate Bipolar Transistors (IGBTs) and MOS-Controlled Thyristors (MCTs).

By a diode valve is meant in this context a set of one or more diodes, delimited by two terminals, electrically functioning as a unit and having the property of being able to carry current in one direction.

By a valve is meant in this context a gate turn-off semiconductor valve with a diode valve connected in an anti-parallel connection.

BACKGROUND ART

A voltage-source converter is connected to a direct-voltage network which occurs as a stiff voltage source towards the converter. This property of the direct-voltage network is often achieved by connecting a capacitor between the poles of the network. It is known to design such converters comprising gate turn-off semiconductor devices, usually connected in a bridge connection. In these cases, the direct voltage of the converter may in some way known per se be controlled by means of pulse-width modulation. The technique comprising pulse-width modulation makes it possible to eliminate the transformer which is normally arranged between the alternating-voltage terminals of the converter and the alternating-voltage network, which entails a considerable saving of cost. However, because of its mode of operation, a bridge of the above-mentioned kind only permits two-pole operation, by which is meant operation with the two direct-voltage terminals of the converter connected to poles on a direct-voltage network which are located at an essentially symmetrical direct voltage in relation to a neutral potential, usually ground potential. This is a serious limitation since, for example in installations for high-voltage direct current with converter stations designed for two-pole operation, in the event of a fault on one of the poles, it is a requirement to be able to maintain single-pole operation, by which is meant operation with one pole in the direct-voltage network at a potential substantially corresponding to the potential of the neutral pole. In installations designed for single-pole operation only, the requirement for a connection of the converter to the alternating-voltage network via a transformer, which requirement is due to technical reasons, is a considerable disadvantage from the point of view of cost.

SUMMARY OF THE INVENTION

The invention aims to provide a converter connection of the kind described in the introductory part of the description, which connection permits operation of single-pole direct-voltage networks including single-pole direct-voltage networks included in installations for transmission of high-voltage direct current.

What characterizes a converter connection according to the invention will become clear from the appended claims.

Advantageous improvements of the invention will become clear from the following description and claims.

BRIEF DESCRIPTION OF THE DRAWINGS

The invention will be described in greater detail in the following with reference to the accompanying drawings, wherein.

DESCRIPTION OF THE PREFERRED EMBODIMENTS

Figure 1:
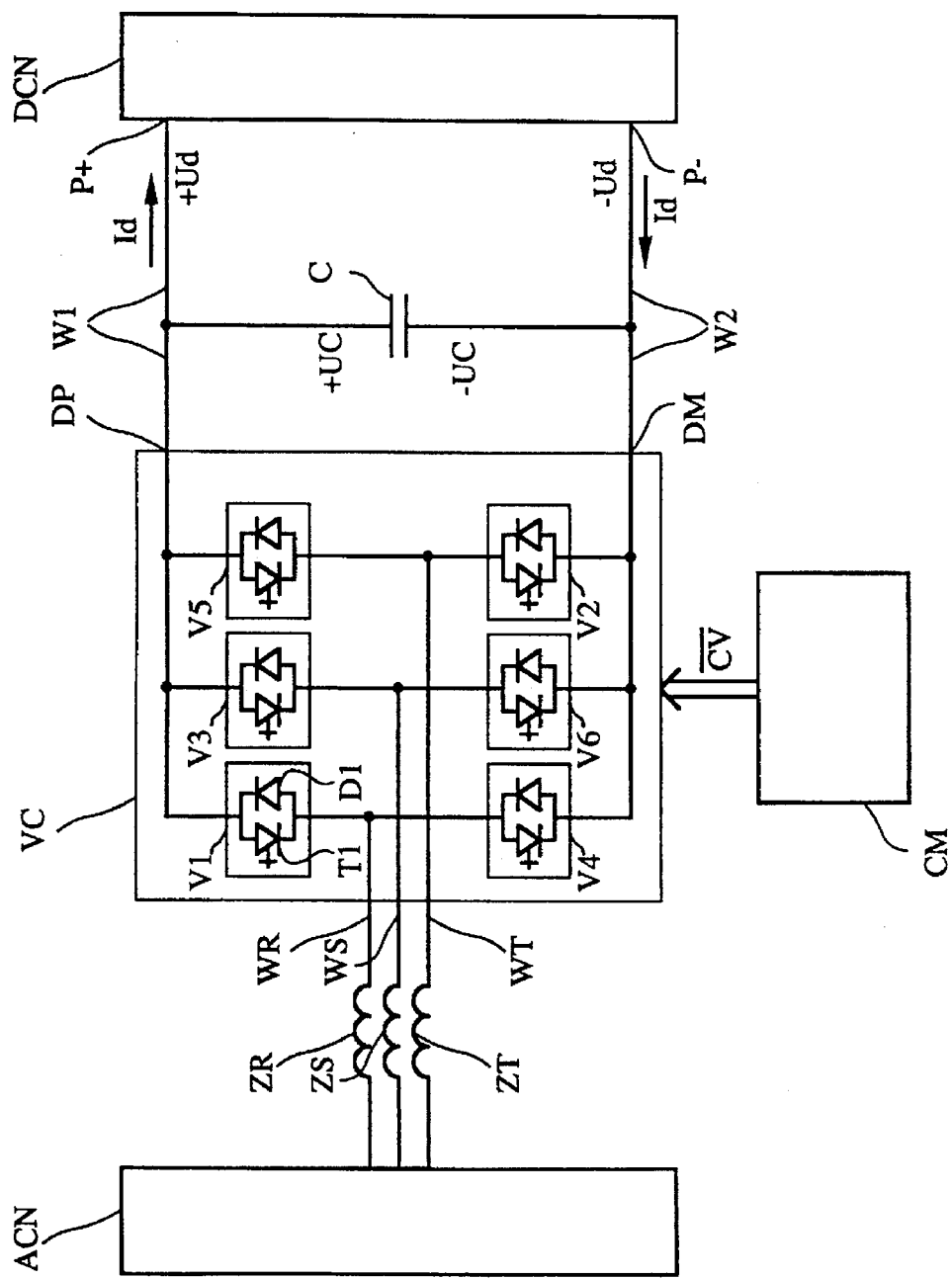
FIG. 1 shows a voltage-source converter of a known kind, connected to a two-pole direct-voltage network.

FIG. 1 shows a three-phase alternating-voltage network ACN, a two-pole power network DCN and a voltage-source converter VC of a known kind. The power network exhibits two poles P+ and P− energized by direct voltage with opposite polarity in relation to that of a neutral pole (not shown). The pole P+ is assumed to have a positive voltage, designated +Ud, and the pole P− a negative voltage −Ud. The converter has a first and a second direct-voltage terminal DP, DM, respectively, and three alternating-voltage leads WR, WS, WT. The direct-voltage terminal DP of the converter is connected by means of an electric pole conductor W1 to the pole P+ of the power network and the direct-voltage terminal DM of the converter is connected by means of an electric pole conductor W2 to the pole P+ of the power network. The alternating-voltage leads of the converter are connected to the alternating-voltage network ACN without an intermediate separate winding transformer but via current-limiting reactors ZR, ZS, ZT, respectively. Between the pole conductors W1 and W2, a capacitor C is connected. The voltage of that terminal on the capacitor which is connected to the direct-voltage terminal DP of the converter is designated +UC and the voltage of that terminal on the capacitor which is connected to the direct-voltage terminal DM of the converter is designated −UC. Via the pole conductors W1 and W2, a direct current Id flows through the power network and through the direct-voltage terminals of the converter.

The converter VC comprises six valves V1–V6, arranged in a three-phase bridge connection. Each one of the valves comprises a gate turn-off semiconductor valve and a diode valve connected thereto in anti-parallel connection. The valve V1, which is connected between the alternating-voltage lead WR and the direct-voltage terminal DP, comprises a gate turn-off thyristor T1 of a so-called GTO type with a diode D1 connected in anti-parallel connection. The valve V4, which is connected between the alternating-voltage lead WR and the direct-voltage terminal DM, and the valves V3, V6 and V5, V2, respectively, which are connected between the alternating-voltage leads WS, WT and the direct-voltage terminals DP, DM, respectively, are of the same kind as the valve V1.

A control member CM generates control signals, in a manner known per se, containing information about firing and extinction orders to the thyristors in the valves V1–V6, which control signals, in the figure denoted by a control vector $\overline{CV}$, are supplied to the converter. In dependence on the control signals, each one of the alternating-voltage leads are connected in accordance with a predetermined pattern to either of the positive or negative poles of the direct-voltage network. The control member may comprise a modulator in order to influence in a manner known per se, for example by pulse-width modulation, according to some predetermined criterion, the pattern according to which the poles of the direct-voltage network are connected to the alternating-voltage circuit. Further, the control member may comprise members in order to generate, in a manner known per se but not shown in the figure, the control signals in dependence on comparisons between sensed quantities, such as, for example, the voltage between the poles of the direct-voltage network and/or the direct current to the direct-voltage network, and reference values for these quantities.

Thus, in the circuit shown in FIG. 1, the voltage on the terminals of the capacitor and on the direct-voltage terminals of the converter is equal to +Ud and −Ud, respectively, and the converter can thus be connected to a symmetrical alternating-voltage network without an intermediate separate winding transformer.

Figure 2:
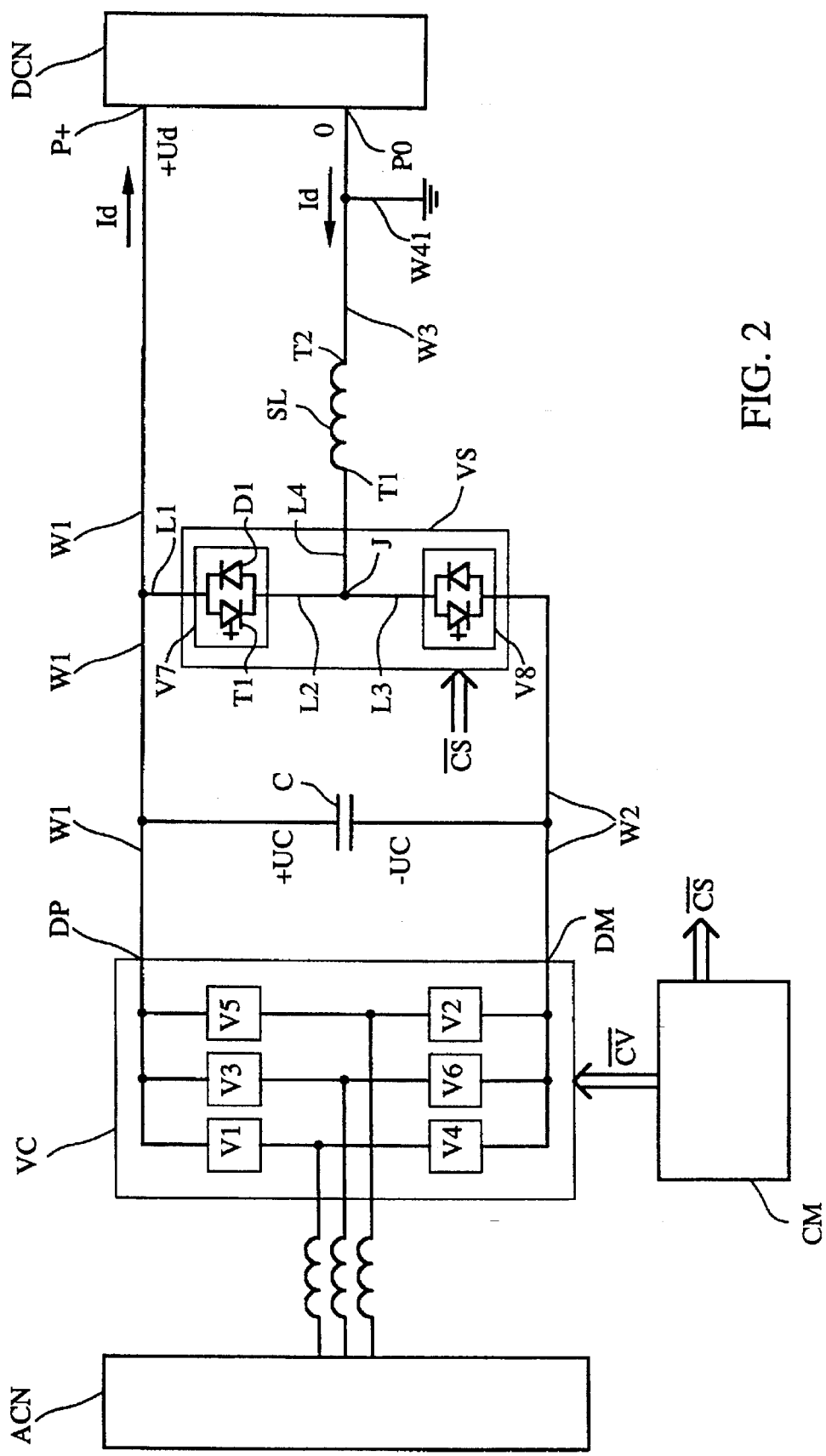
FIG. 2 shows a converter connection according to the invention, connected to a single-pole direct-voltage network.

FIG. 2 schematically shows a converter VC of the same kind as the one described with reference to FIG. 1 and connected in a similar manner to a three-phase alternating-voltage network ACN. A single-pole power network DCN has a direct-voltage pole P+ and a neutral pole P0, which via an electric conductor W41 is connected to ground potential. The pole P+ has a positive voltage, designated +Ud, in relation to the neutral pole, and the voltage of the neutral pole is designated zero. Such a power network cannot, with its respective poles, be directly connected to the direct-voltage terminals of the converter.

A balancing circuit VS comprises a first and a second valve V7, V8, respectively, which are mutually series-connected by means of two electric conductors L2 and L3 at a common connection point J. Each one of the valves V7 and V8 comprises a gate turn-off semiconductor valve, in the figure marked by a gate turn-off thyristor T1 of a so-called GTO type, and a diode valve connected thereto in anti-parallel connection, in the figure marked by a diode D1. The series connection between the valves is so made that the thyristors have the same conducting direction. The series connection of the two valves V7 and V8 is connected between the direct-voltage terminals DP and DM of the converter by means of an electric conductor L1 and an electric pole conductor W2, respectively. A reactor SL with substantially inductive impedance is connected with a first terminal T1 to the connection point J by means of an electric conductor L4 and with a second terminal T2 by means of an electric conductor W3 to the neutral pole of the power network. The direct-voltage terminal DP of the converter is connected by means of an electric pole conductor W1 to the pole P+ of the power network. A capacitor C is connected between the pole conductors W1 and W2. The voltage of that terminal on the capacitor which is connected to the pole conductor W1 and hence to the direct-voltage terminal DP of the converter is designated +UC, and the voltage of that terminal on the capacitor which is connected to the pole conductor W2 and hence to the direct-voltage terminal DM of the converter is designated −UC.

A control device CM generates control signals for control of the converter VC in a similar manner as described with reference to FIG. 1. In addition thereto, the control device CM also generates control signals, containing information about firing and extinction orders to the thyristors in the valves V7 and V8, which control signals, in the figure denoted by a control vector $\overline{CS}$, are supplied to the balancing circuit VS for control of the valves V7 and V8. The control signals in the control vector $\overline{CS}$ are generated in such a way that each one of the valves V7 and V8 is controlled mutually complementarily with a chosen frequency $f_{sv}$, that is, at the same time as a signal is generated which brings the thyristor in valve 7 into a conducting state, another signal is generated which brings the thyristor in valve 8 into a non-conducting state. The pole conductors W1 and W2 and hence the respective two terminals of the capacitor C will thus be alternately connected to the connection point J.

In addition, by generating the control signals such that the thyristors in the valves V7 and V8, respectively, are brought to conduct during mutually equally long intervals, that is, each one of the thyristors conducts during half the period which corresponds to the frequency $f_{sv}$, the time-average value of the voltage at the connection point J becomes equal to the mean value of the voltages of the respective capacitor terminal, that is, equal to zero. Since the reactor SL is assumed to have a substantially inductive impedance, the connection point J, at least from the direct-voltage point of view, will essentially assume the same potential as the neutral pole P0 of the power network.

The frequency $f_{sv}$ for control of the valves V7 and V8 may advantageously be chosen to be of the order of magnitude of 30 times greater than the frequency of the alternating-voltage network. The impedance of the reactor SL for the fundamental frequency of the alternating-voltage network may also advantageously be chosen to be of the order of magnitude of 0.1 to 0.2 per unit, based on the rated power of the converter. A typical dimensioning of the capacitance of the capacitor may then be such that the capacitor is charged to full voltage at nominal direct current in a time of the order of magnitude of 2 ms.

Through the balancing circuit VS and the reactor SL and the above-mentioned way of generating control signals to the valves V7 and V8, when supplying a single-pole power network with the voltage +Ud in relation to its neutral pole, the converter VC will thus be supplied on its direct-voltage terminals with a symmetrical direct voltage +UC and −UC, respectively, in this case equal to +Ud/2 and −Ud/2, respectively. The converter may therefore be connected to an alternating-voltage network without an intermediate separate winding transformer. The direct current Id thereby flows from the direct-voltage terminal DP of the converter to the positive pole P+ of the power network and back via the neutral pole P0 of the power network through the reactor SL and the valve V8 to the direct-voltage terminal DM of the converter.

Figure 3:
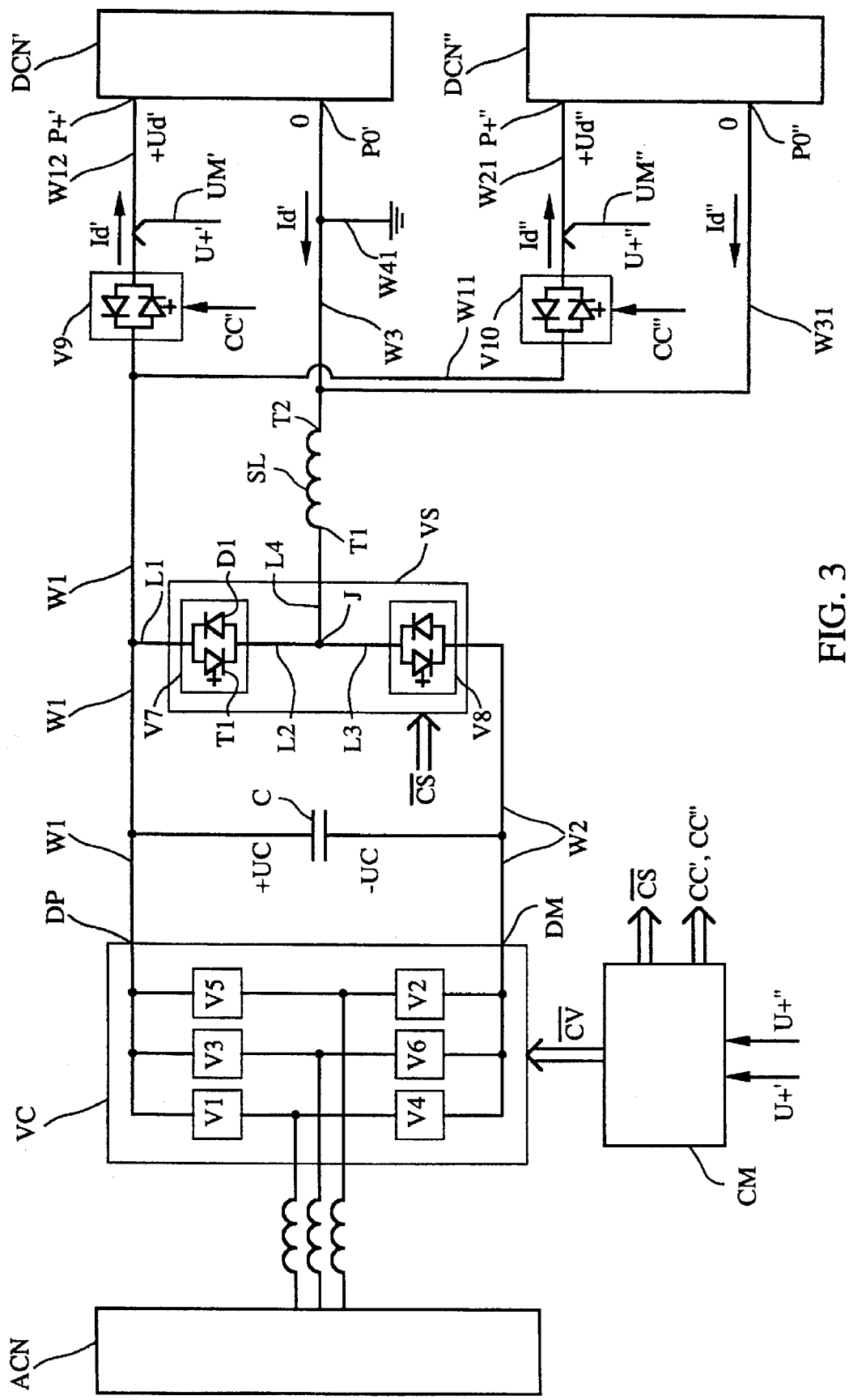
FIG. 3 shows a converter connection according to an improvement of the invention, connected to two single-pole direct-voltage networks.

FIG. 3 shows a converter VC with a control device CM, an alternating-voltage network ACN, a capacitor C, a balancing circuit VS, and a reactor SL of the same kind and mutually connected as described with reference to FIG. 2. Further, the figure shows a first and a second power network DCN' and DCN", respectively, of the same kind as the power network DCN described with reference to FIG. 2. During normal operation, the positive poles P+' and P+", respectively, of the two power network are energized by direct voltages of essentially the same magnitude, in the figure designated +Ud' and +Ud", respectively. The direct-voltage terminal DP of the converter is connected by means of an electric pole conductor W1 to one of the terminals of a first interrupting element V9, the second terminal of which is connected to the positive pole P+' of the first power network by means of an electric pole conductor W12. Further, the direct-voltage terminal DP of the converter is connected by means of an electric pole conductor W11 to one of the terminals of a second interrupting element V10, the second terminal of which is connected to the positive pole P+" of the second power network by means of an electric pole conductor W21. The neutral poles P0' and P0", respectively, of the first and second power networks are connected by means of electric conductors W3 and W31, respectively, to the second terminal T2 of the reactor SL. The neutral pole P0' of the first power network is connected via an electric conductor W41 to ground potential. A direct current Id' flows from the direct-voltage terminal DP of the converter through the first interrupting element to the positive pole P+' of the first power network and back via its neutral pole through the reactor SL and the valve V8 to the direct-voltage terminal DM of the converter and a direct current Id" flows from the direct-voltage terminal DP of the converter through the second interrupting element to the positive pole P+" of the second power network and back via its neutral pole through the reactor SL and the valve V8 to the direct-voltage terminal DM of the converter. The interrupting elements V9 and V10, which are thus serially connected into the pole conductor between the direct-voltage terminal DP of the converter and the respective direct-voltage pole, are each of the same kind as one of the previously described valves V1–V8 and thus each comprise a gate turn-off thyristor T1 of a so-called GTO type with a diode D1 connected in anti-parallel connection.

The voltages U+' and U+" of the pole conductors W12 and W21, respectively, are sensed at the first and second interrupting elements, respectively, by means of first and second voltage-sensing members UM' and UM", respectively (only roughly indicated). Output signals from these voltage-sensing members are supplied to the control device CM, which in a manner known per se generates control signals CC' and CC", respectively, which are supplied to the first and second interrupting elements, respectively. As long as the respective sensed voltage exceeds a preselected comparison value, the respective thyristor is in a conducting state and when the sensed voltage is lower than the comparison value, a control signal is generated which brings the respective thyristor into a non-conducting state. In the event of a short-circuit fault between the pole conductors W12 and W21, respectively, and the neutral pole, the respective interrupting element thus interrupts the connection between the direct-voltage terminals of the converter and the direct-voltage pole of the respective power network. The faulty pole conductor with the associated power network is thus disconnected from the other parts of the circuits shown in the figure, which can thus continue in undisturbed operation.

Figure 4:
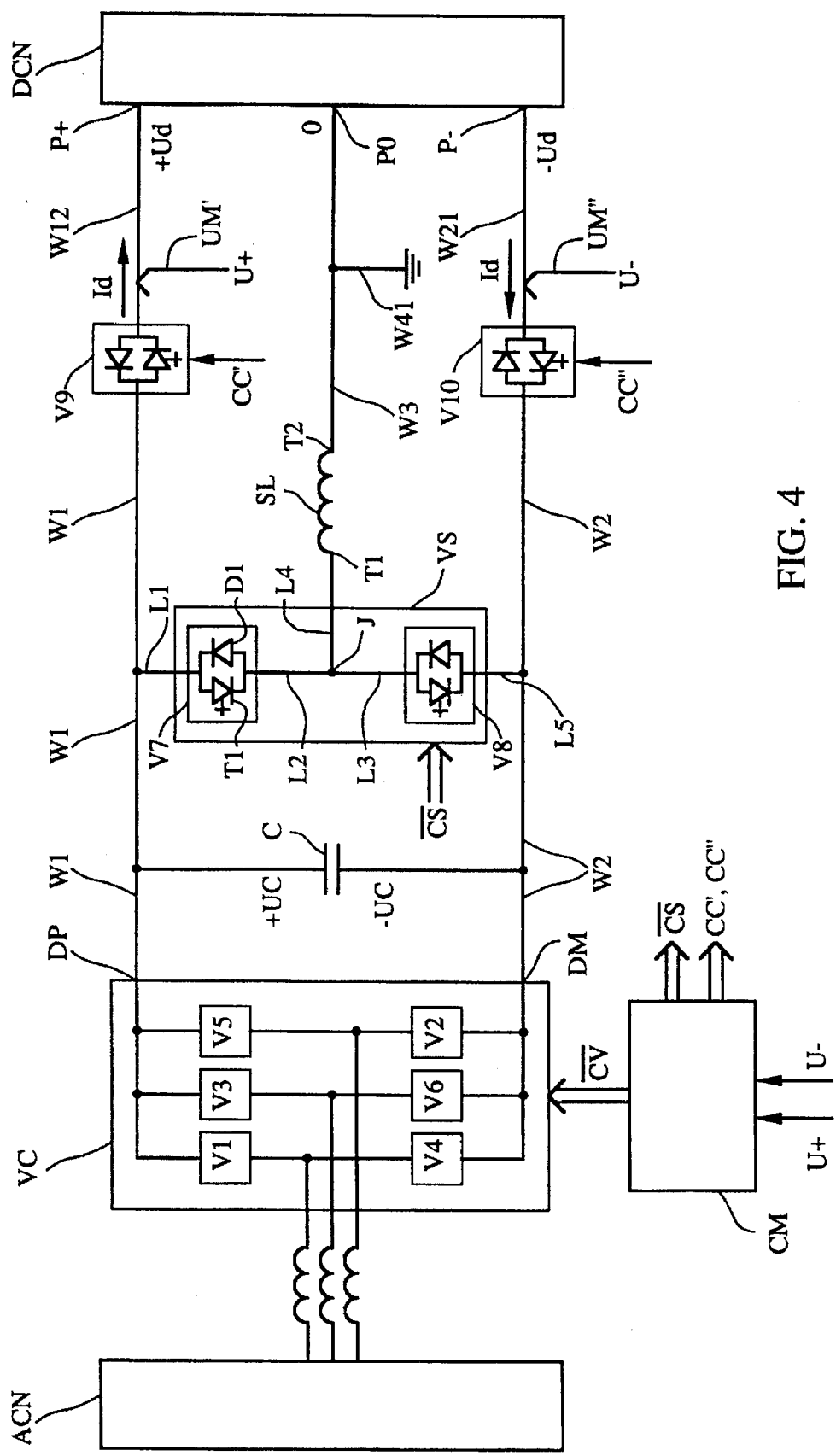
FIG. 4 shows a converter connection according to an improvement of the invention, connected to a two-pole direct-voltage network, FIG. 5 schematically shows parts of an installation for single-pole transmission of high-voltage direct current, comprising a converter connection according to the invention, FIG. 6 schematically shows parts of an installation for single-pole transmission of high-voltage direct current between three converter stations, comprising a converter connection according to the invention, and FIG. 7 schematically shows parts of an installation for two-pole transmission of high-voltage direct current, comprising a converter connection according to the invention.

FIG. 4 shows a converter VC with a control device CM, an alternating-voltage network ACN, a capacitor C, a balancing circuit VS and a reactor SL of the same kind and mutually connected as described with reference to FIG. 2. The connection between the direct-voltage terminal DM of the converter and the valve V8 in the balancing circuit is, however, in FIG. 4 carried out by means of an electric conductor L5. FIG. 4 further shows a two-pole power network DCN and a first and second interrupting element V9 and V10, respectively, of the same kind as described with reference to FIG. 3. The power network exhibits a neutral pole P0 and two direct-voltage poles P+ and P− in relation to the neutral pole and having the opposite polarity. The pole P+ is assumed to have a positive voltage, designated +Ud, and the pole P− a negative voltage −Ud.

The direct-voltage terminal DP of the converter is connected by means of an electric pole conductor W1 to one of the terminals of the first interrupting element V9, the second terminal of which is connected to the positive pole P+ of the power network by means of an electric pole conductor W12. The direct-voltage terminal DM of the converter is connected by means of an electric pole conductor W2 to one of the terminals of the second interrupting element V10, the second terminal of which is connected to the negative pole P− of the power network by means of an electric pole conductor W21. The neutral pole P0 of the power network is connected by means of an electric conductor W3 to the second terminal T2 of the reactor SL and by means of an electric conductor W41 to ground potential. A direct current Id flows from the direct-voltage terminal DP of the converter through the first interrupting element to the positive pole P+ of the power network and back via its negative pole P− through the second interrupting element to the direct-voltage terminal DM of the converter. During symmetrical two-pole operation, the installation shown in the figure thus operates as the one shown in FIG. 1.

The first and second interrupting elements are controlled in dependence on the voltages U+ and U− sensed on the pole conductors W12 and W21, respectively, at the first and second interrupting elements, respectively, in a similar manner as described with reference to FIG. 3.

In the event of a short-circuit fault between the pole conductors W12 and W21, respectively, and the neutral pole, the respective interrupting element thus interrupts the connection between the respective direct-voltage terminal of the converter and the respective positive and negative poles in the power network. The faulty pole conductor and the pole are thus disconnected from the other parts of the circuits shown in the figure, which may change to single-pole operation as described with reference to FIG. 2.

Figure 5:
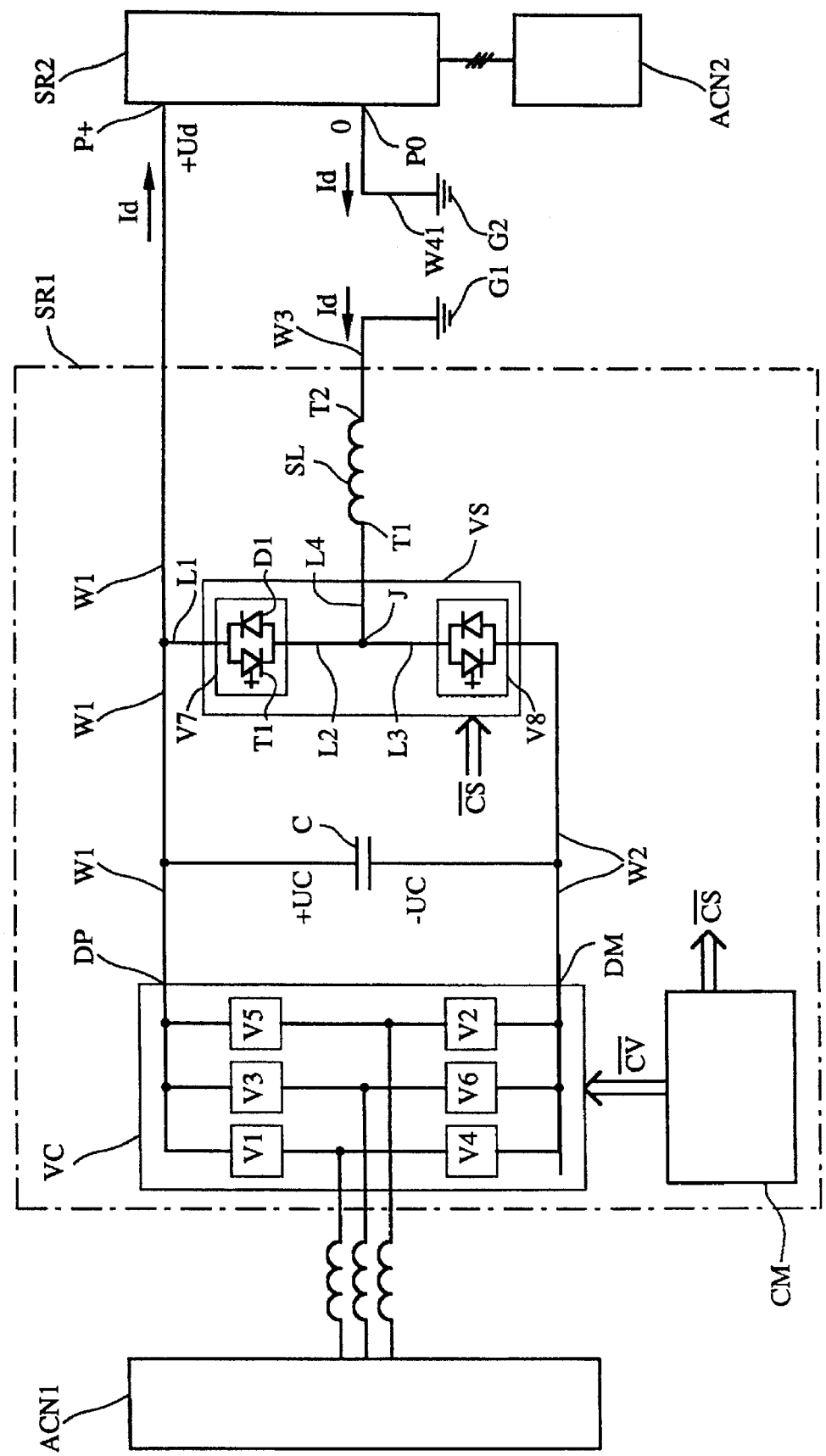

FIG. 5 shows a application of the converter connection according to the invention to an installation for transmission of high-voltage direct current, comprising a first converter station SR1 and a second converter station SR2. The second converter station is of single-pole design and exhibits a neutral pole P0 and a pole P+ energized by direct voltage in relation to the neutral pole, the voltage of the pole P+ being designated +Ud. The second converter station is connected on its alternating-voltage side, in a manner only roughly indicated in the figure, to a second three-phase alternating-voltage network ACN2. The first converter station SR1 comprises a converter VC with a control device CM, a capacitor C, a balancing circuit VS, and a reactor SL of the same kind and being mutually connected as described with reference to FIG. 2, and the converter is connected with its alternating-voltage leads to a first alternating-voltage network ACN1 in a similar manner as described with reference to FIG. 2. The first and second converter stations have a common dc connection comprising an electric pole conductor W1, which connects the direct-voltage terminal DP of the converter to the direct-voltage pole P+ of the second converter station, a first electrode line W3 which connects the second terminal T2 of the reactor SL to a first ground terminal G1, a second electrode line W41, which connects the neutral pole P0 of the second converter station to a second ground terminal G2, and ground as electrically conducting connection between these ground terminals. Further, the first and second converter stations are arranged with measuring devices and control systems, known per se and not shown in the figure, for control of the installation, and the control device CM generates the control vector $\overline{CV}$ in dependence on output signals from these control systems. Otherwise, the function for parts of the first converter station shown in the figure is similar to the function for the converter connection described with reference to FIG. 2.

Figure 6:
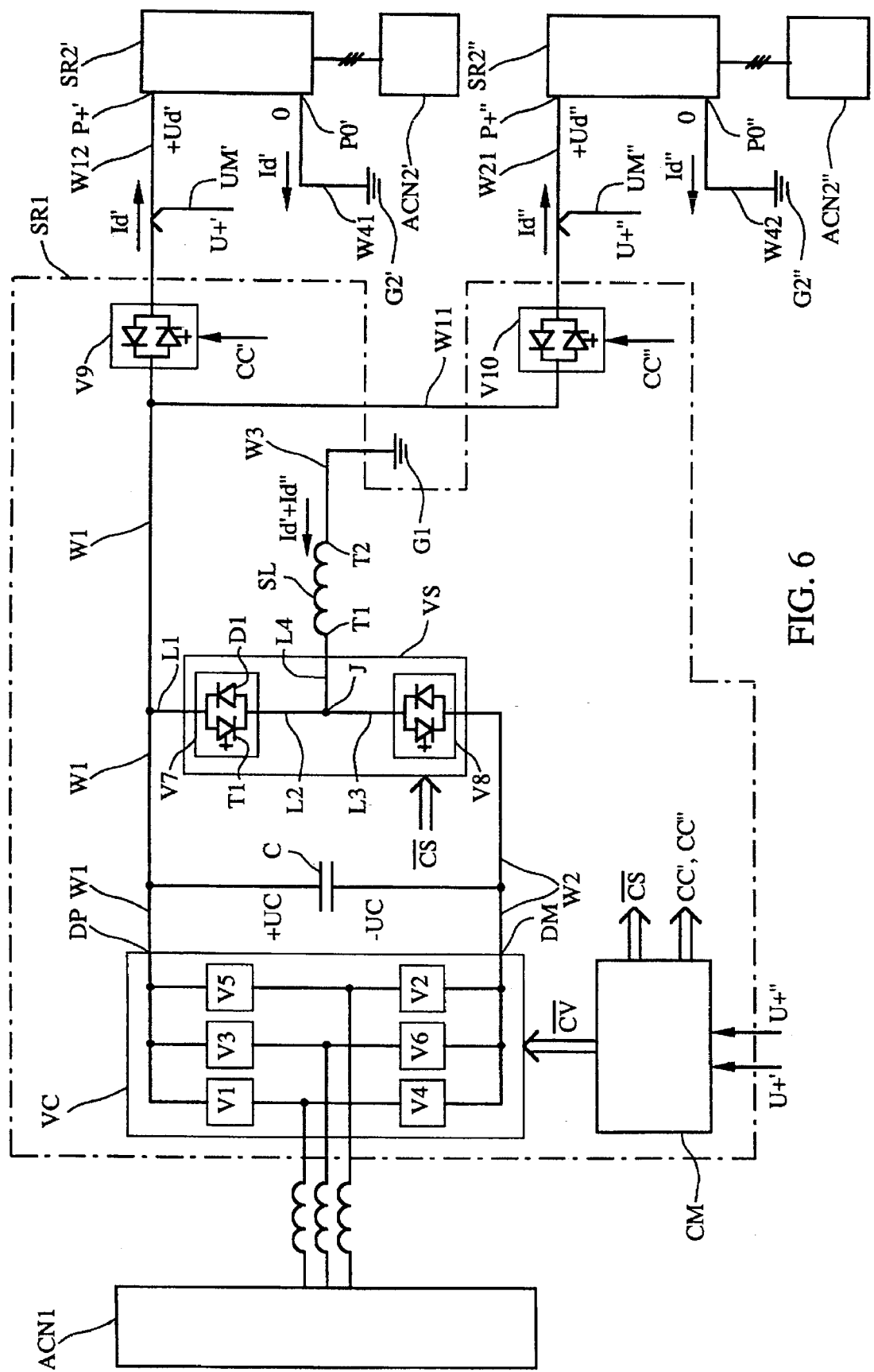

FIG. 6 shows an application of the converter connection according to the invention to an installation for transmission of high-voltage direct current, comprising a first converter station SR1, a second converter station SR2' and a third converter station SR2". The second and third converter stations are of both of single-pole design and they each exhibit a neutral pole P0' and P0", respectively, and a pole P+' and P+", respectively, energized by direct voltage in relation to the neutral pole, the voltage of the latter pole being designated +Ud' and +Ud", respectively. The second and third converter stations are each connected on their alternating-voltage sides, in a manner only roughly indicated in the figure, to a respective one of a second and a third three-phase alternating-voltage network ACN2' and ACN2", respectively. The first converter station SR1 comprises a converter VC with a control device CM, a capacitor C, a balancing circuit VS, and a reactor SL of the same kind and being mutually connected as described with reference to FIG. 2, and the converter is connected with its alternating-voltage leads to a first alternating-voltage network ACN1 in a similar manner as described with reference to FIG. 2. The first and second converter stations have a common dc connection comprising an electric pole conductor W1, which connects the direct-voltage terminal DP of the converter to one of the terminals of a first interrupting element V9, the second terminal of which is connected to the positive pole P+' of the second converter station by means of an electric pole conductor W12, a first electrode line W3 which connects the second terminal T2 of the reactor SL to a first ground terminal G1, a second electrode line W41, which connects the neutral pole P0' of the second converter station to a second ground terminal G2', and ground as electrically conducting connection between these ground terminals. The first and third converter stations have a common dc connection comprising an electric pole conductor W11, which connects the direct-voltage terminal DP of the converter to one of the terminals of a second interrupting element V10, the second terminal of which is connected to the positive pole P+" of the third converter station by means of an electric pole conductor W21, the first electrode line W3, a third electrode line W42, which connects the neutral pole P0" of the third converter station to a third ground terminal G2", and ground as electrically conducting connection between the first ground terminal G1 and the third ground terminal G2".

The interrupting elements V9 and V10 are each of the same kind as those described with reference to FIG. 3 and are controlled in a similar manner by means of control signals CC' and CC" generated by the control device CM in dependence on the voltages U+' and U+", sensed by means of first and second voltage-sensing members UM' and UM", respectively (only roughly indicated), on the pole conductors W12 and W21, respectively, at the first and second interrupting elements, respectively. In the event of a short-circuit fault between the pole conductors W12 and W21, respectively, and the neutral poles of the respective second and third converter stations, the respective interrupting element thus interrupts the connection between the direct-voltage terminal of the converter and the direct-voltage pole of the respective converter station. The faulted part of the installation is thus disconnected by means of the respective interrupting elements from the other parts of the circuits shown in the figure, which can thus continue in undisturbed operation. Otherwise, the mode of operation of the installation shown in FIG. 6 is similar to the mode of operation of the installation described with reference to FIG. 5.

Figure 7:
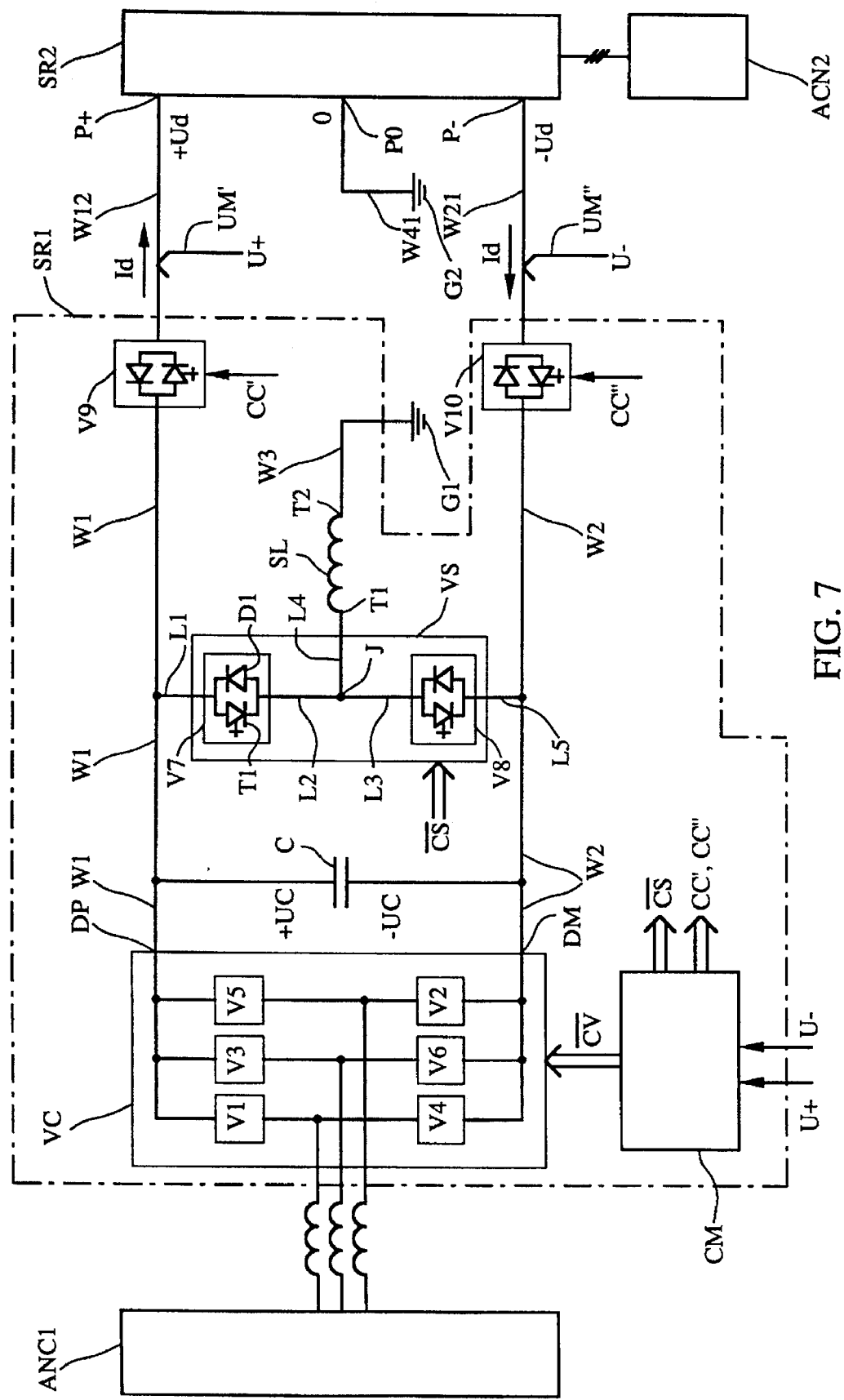

FIG. 7 shows an application of the converter connection according to the invention to an installation for transmission of high-voltage direct current, comprising a first converter station SR1, a second converter station SR2 and a first and second interrupting element V9 and V10, respectively, of the same kind as described with reference to FIG. 3. The second converter station is of two-pole design and exhibits a neutral pole P0 and two poles P+ and P− energized by direct voltage with opposite polarity in relation to the neutral pole. The pole P+ is assumed to have a positive voltage, designated +Ud, and the pole P− a negative voltage −Ud. The second converter station is connected on its alternating-voltage side, in a manner only roughly indicated in the figure, to a second three-phase alternating-voltage network ACN2. The first converter station SR1 comprises a converter VC with a control device CM, a capacitor C, a balancing circuit VS, and a reactor SL of the same kind and being mutually connected as described with reference to FIGS. 2 and 4, and the converter is connected with its alternating-voltage leads to a first alternating-voltage network ACN1 in a similar manner as described with reference to FIG. 2.

The first and second converter stations have a common dc connection comprising an electric pole conductor W1, which connects the direct-voltage terminal DP of the converter to one of the terminals of a first interrupting element V9, an electric pole conductor W12, which connects the second terminal of this interrupting element to the positive pole P+ of the second converter station, an electric pole conductor W2, which connects the direct-voltage terminal DM of the converter to one of the terminals of the second interrupting element V10, an electric pole conductor W21, which connects the second terminal of this interrupting element to the negative pole P− of the second converter station, a first electrode line W3, which connects the second terminal T2 of the reactor SL to a first ground terminal G1, a second electrode line W41, which connects the neutral pole P0 of the second converter station to a second ground terminal G2, and ground as electrically conducting connection between these ground terminals. A direct current Id flows from the direct-voltage terminal DP of the converter through the first interrupting element to the positive pole P+ of the second converter station and back via its negative pole P− through the second interrupting element to the direct-voltage terminal DM of the converter. During symmetrical two-pole operation, the installation shown in the figure thus operates in the same way as that shown in FIG. 1.

Further, the first and second converter stations are provided with measuring devices and control systems, known per se and not shown in the figure, for control of the installation and the control device CM generates the control vector $\overline{CV}$ in dependence on output signals from these control systems.

The first and second interrupting elements are controlled in dependence on the voltages U+ and U− sensed on the pole conductors W12 and W21, respectively, at the first and second interrupting elements, respectively, in a similar manner as described with reference to FIG. 3.

In the event of a short-circuit fault between the pole conductors W12 and W21, respectively, and the neutral pole, the respective interrupting element thus interrupts the connection between the respective direct-voltage terminals of the converter and the respective positive and negative pole in the second converter station. The faulty pole conductor and the associated pole in the second converter station are thus disconnected from the other parts of the circuits shown in the figure, which may thus change to single-pole operation as described with reference to FIGS. 2 and 5. Otherwise, the mode of operation of the parts of the first converter station shown in the figure is similar to the mode of operation of the converter connection described with reference to FIG. 2.

The invention is not limited to the embodiments shown but a plurality of modifications are feasible within the scope of the inventive concept.

The valves V7 and V8 included in the balancing circuit may advantageously be physically built together with the valves V1–V6, included in the converter, into one unit.

Single-pole operation has been exemplified by operation with direct voltage between a neutral pole and a direct-voltage pole with positive voltage in relation to the neutral pole, but the converter connection according to the invention of course also permits single-pole operation with direct voltage between a neutral pole and a direct-voltage pole with negative voltage in relation to the neutral pole.

Besides in the above-mentioned applications in installations for high-voltage direct current, the invention may, of course, also be advantageously applied to installations for distribution of direct current at lower voltage levels.

The second and third converter stations, respectively, described with reference to FIGS. 5, 6 and 7, may advantageously be of the same kind as the first converter station described in these contexts, but may also, at least in certain cases, be of a different kind, for example comprising line-commutated current-source converters. In this connection, however, it must be taken into consideration that installations comprising voltage-source converters are advantageously controlled such that the converter station which operates with rectifiers is controlled in voltage control whereas the converter station which operates with inverters is controlled in power control. A reversal of the active power flux in such installations thus means a reversal of the current direction.

In the installations for transmission of high-voltage direct current described with reference to FIGS. 5–7, the ground or, alternatively, water constitutes part of the electrical connection between the two converter stations. The invention may, of course, also be advantageously applied to installations where this part of the connection consists of an electric conductor. In so-called back-to-back erections, where the dc connection between the two converter stations only consists of short busbars, the interrupting elements V9 and V10 may advantageously be utilized to distinguish the respective alternating-voltage networks from each other.

To reduce switch losses, it may be of advantage to arrange the control of the valves V7, V8 included in the balancing circuit such that the gate turn-off power semiconductor devices included in these valves remain in a non-conducting state as long as there is symmetrical two-pole operation and to allow the balancing circuit to enter into operation in the manner described with reference to FIG. 2 only when single-pole operation occurs.

The sensing of voltage on the pole conductors W12 and W21, respectively, in order to control the interrupting elements V9 and V10, described with reference to FIGS. 3, 4, 6 and 7, may be replaced by sensing of current through the respective pole conductors, in which case the interrupting elements are controlled in such a way that they interrupt the respective connections mentioned when the sensed current exceeds a preselected value.

The valves V1–V8 and the interrupting elements V9–V10 shown in the embodiments have been described as comprising a gate turnoff thyristor of a so-called GTO type and a diode connected thereto in anti-parallel connection. The gate turn-off semiconductor devices may, of course, also be of a different kind, for example as the above-mentioned Insulated Gate Bipolar Transistors (IGBTs) and MOS-Controlled Thyristors (MCTs).

The interrupting elements V9 and V10 have been described in the embodiments as being of the same kind as the two-way semiconductor valves included in the converter. They may, of course, still, within the scope of the inventive concept, be designed in other ways known to a person skilled in the art.

I claim:

1. A converter connection for conversion between alternating voltage and direct voltage, especially at high-voltage direct current, for connection to at least one power network having a neutral pole and at least one pole energized by direct voltage in relation to the neutral pole, said converter connection comprising a voltage-source converter with two direct-voltage terminals, connected to an alternating-voltage network without an intermediate separate winding transformer, a control device for control of said converter and a capacitor connected between said direct-voltage terminals, and at least one of the direct-voltage terminals of the converter is connected by means of an electric pole conductor to at least one of the poles of the power network energized by direct voltage, two valves mutually series-connected at a common point of connection, each of said valves comprising a gate turn-off semiconductor valve and a diode valve connected thereto in anti-parallel connection, said series connection being connected to said direct-voltage terminals, and a reactor with an essentially inductive impedance, with a first terminal connected to said connection point and a second terminal which communicates with said neutral pole in an electrically conducting connection, the control device generating control signals to said gate turn-off semiconductor valves in such a way that the time-average value of the voltage at said connection point becomes substantially equal to the average value of the voltage which occurs across the two terminals of the capacitor.

2. A converter connection according to claim 1, for connection to at least two power networks, each one having a neutral pole and at least one pole, energized by direct voltage in relation to the neutral pole and the neutral poles of which communicate in an electrically conducting connection with each other and the respective poles of which, energized by direct voltage, are energized with essentially the same voltage in relation to the respective neutral poles, at least two interrupting elements, each one being serially connected into a respective one of said pole conductors and adapted, in dependence on a sensed voltage of the respective pole conductor or in dependence on a sensed current flowing through the respective pole conductor, to interrupt the connection between said direct-voltage terminals and the respective said pole energized by direct voltage.

3. A converter connection according to claim 1, for connection to at least one power network having a neutral pole and two poles energized by direct voltage with opposite polarity in relation to the neutral pole, and each one of the direct-voltage terminals of said converter being connected by means of respective electric pole conductors to a respective one of the poles of the power network energized by direct voltage, at least two interrupting elements, each one being serially connected into a respective one of said pole conductors and adapted, in dependence on a sensed voltage of the respective pole conductor or in dependence on a sensed current flowing through the respective pole conductor, to interrupt the connection between said direct-voltage terminals and the respective said pole energized by direct voltage.

4. A converter connection according to claim 1, said control device generates to each of said valves mutually complementary control signals with equal lengths for the respective conducting intervals for the gate turn-off semiconductor valve included in the valves.

5. An installation for transmission of high-voltage direct current, comprising at least a first and a second converter station, and a common dc connection, at least the first converter station comprising a voltage-source converter with two direct-voltage network terminals connected to a first alternating-voltage network without an intermediate separate winding transformer, a control device for control of said converter and a capacitor connected between said direct-voltage terminals, and the second converter station is connected to a second alternating-voltage network and exhibits a neutral pole and at least one pole energized by direct voltage in relation to the neutral pole, and at least one of the direct-voltage terminals of the converter being connected by means of a first electric pole conductor to at least one of the poles of the second converter station energized by direct voltage, at least the first converter station further comprises two valves mutually series-connected at a common point of connection, each of said valves comprising a gate turn-off semiconductor valve and a diode valve connected thereto in anti-parallel connection, said series connection being connected between said direct-voltage terminals, and a reactor with an essentially inductive impedance, with a first terminal connected to said connection point and a second terminal which communicates with the neutral pole of the second converter station in an electrically conducting connection, the control device generating control signals to said gate turn-off semiconductor valves in such a way that the time-average value of the voltage at said connection point becomes substantially equal to the average value of a voltage which occurs across the two terminals of the capacitor.

6. An installation for transmission of high-voltage direct current according to claim 5, comprising at least a third converter station with a dc connection common to said first converter station, the third converter station being connected to a third alternating-voltage network and having a neutral pole and at least one pole energized by direct voltage in relation to the neutral pole, and the neutral poles of said at least second and third converter stations communicating with each other in an electrically conducting connection and their respective poles energized by direct voltage being energized with essentially the same voltage in relation to the respective neutral poles, and at least one of the direct-voltage terminals of the converter being connected by means of a second electric pole conductor to at least one of the poles of the third converter station energized by direct voltage, the first converter station further comprises at least two interrupting elements, each one being serially connected into a respective one of the first and second pole conductors and being adapted, in dependence on a sensed voltage of the respective pole conductor or in dependence on a sensed current flowing through the respective pole conductor, to interrupt the connection between said direct-voltage terminals and said pole of the second and third converter stations, respectively, energized by direct voltage.

7. An installation for transmission of high-voltage direct current according to claim 5, wherein the second converter station exhibits a neutral pole and two poles energized by direct voltage with opposite polarity in relation to the neutral pole, and that each of the direct-voltage terminals of said converter is connected by means of respective electric pole conductors to a respective one of the poles of the second converter station which are energized by direct voltage, the first converter station further comprises two interrupting elements, each one being serially connected into a respective one of said pole conductors and being adapted, in dependence on a sensed voltage of the respective pole conductor or in dependence on a sensed current flowing through the respective pole conductor, to interrupt the connection between said respective direct-voltage terminals and said respective pole of the second converter station energized by direct voltage.

* * * * *